United States Patent [19]

Fock et al.

[11] Patent Number: 5,338,485
[45] Date of Patent: * Aug. 16, 1994

[54] POLYACRYLATE ESTERS WITH LONG-CHAIN HYDROCARBON AND POLYOXYALKYLENE GROUPS AND THEIR USE AS SURFACE ACTIVE SUBSTANCES

[75] Inventors: Jürgen Fock, Düsseldorf; Eberhard Esselborn; Dietmar Schaefer, both of Essen, all of Fed. Rep. of Germany

[73] Assignee: The Goldschmidt AG, Essen, Fed. Rep. of Germany

[*] Notice: The portion of the term of this patent subsequent to Jul. 28, 2009 has been disclaimed.

[21] Appl. No.: 843,912

[22] Filed: Feb. 27, 1992

Related U.S. Application Data

[63] Continuation-in-part of Ser. No. 471,554, Jan. 29, 1990, Pat. No. 5,133,898.

[30] Foreign Application Priority Data

Mar. 3, 1989 [DE] Fed. Rep. of Germany ....... 3906702

[51] Int. Cl.$^5$ .......................... B01F 17/42; C08F 8/14; C08F 20/18; C08F 120/18
[52] U.S. Cl. ...................... 252/309; 44/301; 252/356; 252/DIG. 1; 525/330.6; 526/329.7
[58] Field of Search ................ 252/309, 356, DIG. 1; 44/301; 525/330.6; 526/329.7

[56] References Cited

U.S. PATENT DOCUMENTS

| 3,180,835 | 4/1965 | Peri | 252/309 |
| 3,442,842 | 5/1969 | von Bonin | 252/309 X |
| 3,505,268 | 4/1970 | Backhouse et al. | 252/356 X |
| 4,001,159 | 1/1977 | Imai et al. | 524/562 |
| 4,274,933 | 6/1981 | Kamada et al. | 526/329.7 X |
| 4,792,343 | 12/1988 | Hawe et al. | 252/DIG. 1 |
| 4,872,885 | 10/1989 | Tsubakimoto et al. | 252/356 X |
| 4,908,155 | 3/1990 | Leemans et al. | 252/356 X |
| 5,133,898 | 7/1992 | Fock et al. | 252/356 |

FOREIGN PATENT DOCUMENTS 3636429 8/1987 Fed. Rep. of Germany .

Primary Examiner—Richard D. Lovering
Attorney, Agent, or Firm—Anderson Kill Olick & Oshinsky

[57] ABSTRACT

Polyacrylate esters with long-chain hydrocarbon and polyoxyalkylene groups are disclosed, which are prepared by transesterification of polyacrylate alkyl esters, the alkyl groups of which have 1 to 4 carbon atoms and which were obtained by free radical polymerization, wherein the transesterification is carried out with a mixture of selected alcohols and polyoxyalkylene monools. Compared to products obtained by copolymerization, the transesterification products are largely free of undesirable low molecular weight components, have a narrow molecular weight distribution and exhibit excellent surfactant properties. They are useful especially as W/O emulsifiers for natural and synthetic oils.

13 Claims, No Drawings

POLYACRYLATE ESTERS WITH LONG-CHAIN HYDROCARBON AND POLYOXYALKYLENE GROUPS AND THEIR USE AS SURFACE ACTIVE SUBSTANCES

CROSS REFERENCE TO RELATED APPLICATION

This is a continuation-in-part of application Ser. No. 07/471,554, filed Jan. 29, 1990, now U.S. Pat. No. 5,133,898.

BACKGROUND OF THE INVENTION

The invention relates to polyacrylate esters with long-chain hydrocarbon and polyoxyalkylene groups, as well as to their use as surface active substances. In particular, the invention concerns polyacrylate esters with long-chain hydrocarbon and polyoxyalkylene groups with a reduced content of lower molecular weight components, as well as with a distribution of polymers which approximates the Poisson distribution. This distribution has the result that the compounds exhibit a low coefficient of non-uniformity $\overline{M}_w/\overline{M}_n$.

In another aspect, the invention relates to the use of such polyacrylate esters as surface active substances, in particular, as emulsifiers for the preparation of emulsions from natural and synthetic oils and water and especially the use of the aforementioned polyacrylate esters for the preparation of W/O emulsions of natural and synthetic oils.

Copolymers of polyoxyalkylene (meth)acrylates and alkyl (meth)acrylates are known from the art. In Japanese publication 61/145254, organic and inorganic pigments are disclosed, the surface of which is treated with a copolymer which consists of 1% to 99% by weight of polyoxyalkylene (meth)acrylate and 1 to 99% by weight of alkyl methacrylate, wherein the alkyl group of the alkyl methacrylate has 6 to 22 carbon atoms. These copolymers increase the dispersibility of pigments that are treated therewith.

German Offenlegungsschrift 3,636,429 discloses polymeric surfactants based on copolymers of hydrophobic and hydrophilic monomers which contain, in copolymerized form, (a) as hydrophobic monomers, compounds of the formula $$\begin{array}{c} R \\ | \\ CH_2=C-CO-O-X \end{array}$$

in which
R represents H or $CH_3$
X represents $C_4$ to $C_{20}$ alkyl or

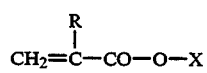

$R^1$ represents H, $C_1$ to $C_{20}$ alkyl, halogen or

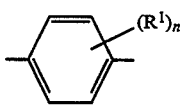

n is 1 to 4
$R^2$, $R^3$ represent H, $C_1$ to $C_{20}$ alkyl F, Cl, Br and (b) as hydrophilic monomers, compounds of the formula $$\begin{array}{c} R \\ | \\ CH_2=C-CO-O-Y \end{array}$$

in which
R represents H, $CH_3$,
Y is

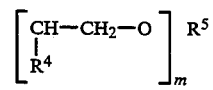

$R^4$ represents H, $CH_3$ or $C_2H_5$
$R^5$ represents H or $C_1$ to $C_4$ alkyl and
m is 2 to 50.

In aqueous systems, above the critical micelle concentration, these polymeric surfactants form micellar structures, which, in the case of a suitable structure and in particular concentration ranges, are present as liquid crystalline phases (mesophases). The copolymers disclosed in German Offenlegungsschrift 3,636,429 are said to make possible a wide variation of mesophasic structures and stability parameters. The copolymers have surfactant properties and the water soluble compounds can be used in detergent formulations to enhance detergency. The copolymers can also be used to increase the viscosity of aqueous phases, the viscosity increasing effect being largely independent of pH.

The compounds disclosed in German Offenlegungsschrift 36 36 429 are produced by copolymerization of the hydrophilic and hydrophobic monomers. These different monomers exhibit different polymerization parameters. This in turn causes the individual monomers to be not polymerized in homogeneous distribution to form a polymeric molecule. This can be demonstrated gelchromatagraphically by the existence of several peaks and a broad molecular weight distribution in the average polymer molecule. Gas chromatagraphically and by NMR spectroscopy, significant amounts of monomers and/or low-polymeric compounds can be demonstrated in the polymer. These moieties cannot be removed in economic manner from the mixture, since the boiling points of the monomeric compounds are too high for separation by distillation. Removal in other ways such, for example, by a selective extraction of the low molecular moieties is also not possible since the solubility behavior of the individual components is too similar and/or the compounds exhibit tensidic, to wit: surface active, properties which prevent the formation of separate layers between different immiscible solvents. This causes these compounds of the state of the art to exhibit a relatively high coefficient of non-uniformity.

However, for various reasons, these low molecular weight compounds are undesirable. The low molecular weight portions detract from and decrease the surface active properties of the known copolymers, since they themselves contribute little if anything to these properties. The low molecular weight portions are also undesirable for physiological reasons, since they can lead to health impairment, such as skin irritations, sensitization, etc.

SUMMARY OF THE INVENTION

It is an object of the invention to provide polyacrylate esters with long-chain hydrocarbon and polyoxyalkylene groups, which have, on the one hand, outstanding surfactant properties and, on the other, significantly improved physiological properties.

This object and others are achieved by the invention, whereby polyacrylate esters of the aforementioned types are provided which have as narrow a molecular weight distribution as possible and are as free as possible from monomeric and/or low molecular weight compounds.

According to the invention, polyacrylate esters having the desired combination of properties are obtained by the transesterification of alkyl esters of polyacrylic acids, the alkyl groups of which contain 1 to 4 carbon atoms and which are prepared by a free radical polymerization, wherein the transesterification is carried out with a mixture of:
a) alcohols, selected from the group consisting of
  a1) saturated aliphatic alcohols with 4 to 22 carbon atoms,
  a2) unsaturated aliphatic alcohols with 8 to 22 carbon atoms,
  a3) alkyl phenols, the alkyl groups of which in each case have 8 to 12 carbon atoms or their oxyalkylation products with 1 to 4 oxyethylene and/or oxypropylene groups, and
b) polyoxyalkylene monools, i.e. polyoxyalkylene mono-alcohols of the general, average formula $$R^1O\text{-}(C_nH_{2n}O\text{-})_xH$$

wherein
$R^1$ is the hydrocarbon group of a starter alcohol, $R^1OH$,
n is 2, 3 or 4 and has an average value of 2 to 3 in the average polyoxyalkylene group,
x has an average value of 4 to 50 in the average polyoxyalkylene group, wherein the molar ratio of a:b is 1:11 to 28:1, in such amounts, that up to 70% of the ester groups are reacted, in the presence of a known transesterification catalyst at a temperature of about from 70° to 160° C., optionally in the presence of a solvent.

DESCRIPTION OF THE INVENTION

It is an important characteristic of the invention that the inventive polyester esters are obtainable by transesterification with a mixture of alcohols. By these means, it becomes possible to start with polyacrylate alkyl esters having a narrow molecular weight distribution and this narrow molecular weight distribution of the starting material is retained during transesterification.

For the transesterification, those polyacrylate alkyl esters are used which have alkyl groups of 1 to 4 carbon atoms. The methyl group is a particularly preferred alkyl group. The alkyl groups are selected primarily with respect to the boiling point of the corresponding alcohols. An alkyl group with 1 carbon atom is therefore preferred, because methanol is the alcohol which can be removed most easily from the reaction mixture in the course of the transesterification. As the number of carbon atoms increases, the removal of the alcohols creates greater difficulties. This limits the number of carbon atoms in the alkyl group to four. It is, of course, also possible to use alkyl groups with more than 4 carbon atoms under some circumstances. However, this would only represent an inferior embodiment of the invention.

For the transesterification, a mixture of alcohols a) and b) is used.

The group a) includes a1): saturated aliphatic alcohols with 4 to 22 carbon atoms. In the usual case, these alcohols are fatty alcohols, such as those prepared by the reduction of naturally occurring raw materials. Particularly preferred as component a1) are saturated fatty alcohols with 12 to 18 carbon atoms, especially stearyl alcohol and suet or tallow fatty alcohol. It is evident to those skilled in the art that mixtures, especially natural mixtures of such fatty alcohols, can also be used.

As alcohols of group a) defined in a2), unsaturated aliphatic alcohols with 8 to 22 carbon atoms can also be used for the transesterification. Of these, oleyl alcohol is particularly preferred. Polyacrylate esters with oleyl and polyoxyalkylene groups can be synthesized by copolymerization only if appreciable disadvantages are accepted, since the double bond of the oleyl group interferes significantly during the polymerization reaction. These difficulties do not arise with the transesterification reaction. Polyacrylate esters, transesterified with oleyl alcohol and polyoxyalkylene monools, have particularly good application properties, such as outstanding emulsifiability and low pour points. The use of unsaturated aliphatic alcohols as component a) therefore represents a particularly preferred embodiment of the invention.

A further possible a) component are the a3) alkylphenols, the alkyl groups of which in each case have 8 to 12 carbon atoms. In this connection, it is particularly advantageous to use for the transesterification alkylphenols which have undergone an addition reaction with 1 to 3 moles of ethylene oxide and/or propylene oxide. By these means, the resistance to hydrolysis of the inventive polyacrylate esters is increased.

Alcohols of the aforementioned a1), a2) and a3) groups can be used individually or in admixture with one another.

The transesterification component b) is formed by polyoxyalkylene monools of the average, general formula $$R^1O\text{-}(C_nH_{2n}O\text{-})_xH$$

wherein $R^1$ is the hydrocarbon group of an initial or starter alcohol, $R^1OH$. The starter alcohol $R^1OH$ preferably is a lower alcohol. Accordingly, $R^1$ preferably is a methyl, ethyl, propyl, octyl, isooctyl, allyl or butyl group. However, long-chain groups or arylalkyl groups, such as benzyl groups, may also be selected. The nature of the $R^1$ group has relatively little influence on the properties of the polyacrylate esters, so that there are relatively few restrictions with respect to the choice of the $R^1$ substituent.

Subscript n can have a value of 2, 3 or 4, so that the oxyalkylene group in the parentheses is an oxyethylene, oxypropylene, oxybutylene or oxytetramethylene group. Since the polyoxyalkylene monools are present in the form of a polymeric mixture, the average value of n may also be a fraction. Preferably, the average value of n is 2 to 3 and particularly 2.1 to 2.4. The oxyalkylene groups may be arranged in blocks or distributed at random.

Subscript x indicates the number of oxyalkylene groups. It has an average value of 4 to 50 and preferably of 6 to 20.

For the transesterification, a mixture of alcohols a) and b) is used; the molar ratio of a):b) is 1:11 to 28:1, preferably 1:10 to 10:1 and especially 5:1 to 9:1.

This mixture, consisting of a) and b), is used in such amounts for the transesterification of the polyacrylate alkyl esters, that up to 70% of the ester groups are transesterified. To obtain the desired surfactant properties, the degree of transesterification should not fall below 30%.

The transesterification is carried out in the presence of known transesterification catalysts, such as isopropyl or butyl titanate, potassium or sodium methylate, p-toluenesulfonic acid, methanesulfonic acid and trifluoroacetic acid. The temperature of the transesterification reaction is 70° to 160° C., a temperature in the range of 110° to 150° C. being preferred.

The transesterification may optionally be carried out in the presence of a solvent, such as toluene or xylene.

The hydrophilic or hydrophobic character of the inventive polyacrylate esters can be affected and controlled in a desirable manner by the following measures, individually or in combination.

The hydrophobic character of the polyacrylate esters increases with the number of carbon atoms in the alcohols a) and the proportion of alcohols a) increases relative to the polyoxyalkylene monools b). The hydrophobicity of the polyacrylate esters varies inversely with the numerical value of the subscript x and directly with the numerical value of the subscript n. The hydrophobicity may furthermore be increased by selecting a long-chain hydrocarbon group as $R^1$ group.

Conversely, the hydrophilic character of the inventive polyacrylate esters is promoted by a high content of polyoxyalkylene monools in the transesterification mixture of a) and b); low values of n and high values of x increase the hydrophilicity.

By appropriate selection of the alcohols a) and b) and their ratio to one another, it is thus possible to adjust the hydrophilic-lipophilic balance (HLB value) and to adapt the inventive transesterification products to the requirements of the application. This selective variability cannot be achieved with the copolymers of the state of the art.

It is clear to those skilled in the art that the polyacrylate alkyl esters used as starting materials for the transesterification reaction may also contain other copolymerized comonomers, such as styrene, acrylamide, acrylonitrile or alkyl methacrylate esters.

In a particular aspect of the invention, those inventive polyacrylate esters are preferred which are obtained by the transesterification of polyacrylate alkyl esters in which up to 50 mole percent of the acrylate alkyl esters are replaced by the corresponding methacrylate alkyl esters.

Polyacrylate esters of the invention have the required high surfactant activity. They are excellent emulsifiers. This is shown in the examples by means of the emulsification of water in diesel oil. Very stable emulsions, which can, for example, be combusted to advantage as fuels in gas turbines operated with diesel oil, are obtained with slight amounts of the inventive surfactants.

The invention thus also includes the use of the inventive polyacrylate esters as highly effective surfactants, especially as highly effective emulsifiers. It relates in particular to the use of inventive polyacrylate esters of suitable HLB range as W/O emulsifiers for natural and synthetic oils. In this connection, it is of particular advantage that the inventive polyacrylate esters have not only a high effectiveness, but also good physiological properties.

The preparation of the inventive polyacrylate esters and their useful properties for industrial applications are described in even greater detail in the following examples, which illustrate the best mode currently contemplated for carrying out the invention. However, the examples must not be construed as limiting the invention in any manner.

Examples 1 through 3 describe the preparation of a starting product in the nature of a polymethylacrylate, while Example 4 is concerned with the preparation of a polyacrylic acid-n-butyl ester by free radical polymerization.

It follows that Examples 1–4 are not examples pursuant to the invention.

Examples 5–25 explain the preparation of the inventive compounds by transesterification of polyacrylic acid alkyl esters with alcohols and polyoxyalkylenemonools.

Examples 27–32 are concerned with the preparation of comparison compounds of the state of the art by copolymerization of the different monomeric acrylic acid esters. The properties and characteristics of these compounds are then compared, in comparison Tables 1 and 2, with those of the inventive compounds.

EXAMPLE 1

Preparation of Poly(Methyl Acrylate) by Free Radical Polymerization (not of the invention)

A solution of 0.6 g of azodiisobutyronitrile and 20.2 g of dodecyl mercaptan in 50 g of toluene and 280 g (approximately 3.25 moles) of methyl acrylate is added over a period of 2 hours to a reactor containing 53 g of toluene; the solvent in the reactor is at a temperature of 100° C. and protected by an atmosphere of nitrogen. Subsequently, a further 0.9 g of azodiisobutyronitrile, dissolved in 20 g of methyl ethyl ketone are added over a period of 30 minutes. Finally, the reaction mixture is heated for another 1 hour at the same temperature of 100° C. At the end of the reaction, the solvent is distilled off. A colorless, viscous liquid with a refractive index of 1.4802 remains behind. Gel chromatographic analysis reveals that the polymer obtained has a number average molecular weight $\overline{M}_n$ of 1950 and a weight average molecular weight $\overline{M}_w$ of 3330; the nonuniformity coefficient accordingly is 1.71. The residual monomer content is less than 0.1%.

EXAMPLES 2 AND 3

Preparation of Poly(Methyl Acrylates) of Higher Molecular Weight by a Free Radical Polymerization (not of the invention)

The procedure of Example 1 is followed with the exception that the dodecyl mercaptan content is lowered. The functional relationship between the number average and weight average molecular weights and the dodecyl mercaptan content is shown in Table 1. In both cases, the residual monomer content is found to be less than 0.1%.

TABLE 1

| Poly(methyl acrylate) from Example | Dodecyl Mercaptan (% by weight) | Molecular Weight $M_n$ | Molecular Weight $M_w$ | Non-uniformity Coefficient |
| --- | --- | --- | --- | --- |
| 2 | 2.95 | 4,453 | 11,346 | 2.55 |
| 3 | 0.43 | 16,750 | 68,500 | 4.09 |

EXAMPLE 4

Preparation of Poly(n-Butyl Acrylate) by a Free Radical Polymerization (not of the invention)

The method of Example 1 is followed, with the exception that n-butyl acrylate is used instead of methyl acrylate.

From gel chromatographic analysis, it follows that the polymer obtained has a number average molecular weight $\overline{M}_n$ of 1900 and a weight average molecular weight $\overline{M}_w$ of 3300; the nonuniformity coefficient accordingly is 1.73. The residual monomer content is determined to be less than 0.1%.

EXAMPLE 5

Transesterification of Poly(Methyl Acrylate) with Oleyl Alcohol and Polyethylene Oxide/Polypropylene Oxide Monool The poly(methyl acrylate) from Example 1 (369.2 g), dissolved in 982.8 g of toluene, is heated under nitrogen together with 463.8 g (approximately 1.75 moles) of oleyl alcohol and 149.8 g (approximately 0.25 moles) of a polyalkylene oxide, which was started with methanol and consists of 85% by weight of ethylene oxide and 15% by weight of propylene oxide (hydroxyl number=93.5; molecular weight=approximately 600). To begin with, any traces of water present are removed by azeotropic distillation. After that, 1.65 g of isopropyl titanate are added. The methanol which is formed during the transesterification is removed from the toluene by fractionation. A further 1.65 g of isopropyl titanate are added after 2 hours and after 4 hours of reaction. The reaction is completed after about 6 hours; the end of the reaction is indicated by a stillhead temperature of about 110° C.

The oleyl alcohol content, determined by gas chromatographic analysis, is less than 0.4% and corresponds to a conversion of 99.2%, based on the amount of the fatty alcohol that was used. Gel chromatographic analysis reveals that 1 to 2% of the polyalkylene oxide monool has not reacted; this corresponds to a conversion of 90 to 95% of the theoretical amount. The methanol content in the distillate is 60.1 g or 22.3% by weight and corresponds to a conversion of 93.9% of the theoretical amount. According to DIN (ISO) 3016, the product has a pour point of about −15° C. and, after removal of the catalyst, a Gardner color number of 0 to 1. The number average molecular weight is 7500 (theoretical) and 6500 (in fact). The nonuniformity coefficient is 2.5.

EXAMPLES 6 TO 24

Transesterification of Poly(Methyl Acrylates) of Different Molecular Weights with Different Fatty Alcohols and Polyalkylene Oxide Monools The method of Example 1 is followed, with the exception that poly(methyl acrylates) of different molecular weights, different fatty alcohols and polyalkylene oxide monools, with respect to the methyl ester groups, and varying molar and weight ratios are used. The molecular weight and the amount of the fatty alcohol, the nature and amount of the polyalkylene oxide monool, the theoretical degree of substitution, which is calculated from the ratio of the number of substituted ester groups, and the pour points determined by the method of DIN (ISO) 3016, the reaction yields determined from the amount of methanol (MeOH) released and from the amount of fatty alcohol that has not reacted, and the number average molecular weight and the nonuniformity coefficient, determined theoretically and by gel chromatographic analysis, are given in Table 2.

TABLE 2

| Example No. | Poly(Methyl Acrylate) $\overline{M}_n$ | Amount (g) | Fatty Alcohol Type | Amount (g) | Polyalkylene Oxide Monool Type | Amount (g) | Substitution Degree (Mole %) | Pour Point (°C.) | Yield (%) MeOH | Yield (%) Fatty Alcohol | $\overline{M}_n$ (g/mole) theor. | $\overline{M}_n$ (g/mole) pract. | $\overline{M}_w/\overline{M}_n$ |
| --- | --- | --- | --- | --- | --- | --- | --- | --- | --- | --- | --- | --- | --- |
| 5 | 1950 | 92.3 | OLA | 115.9 | 0615 | 37.5 | 0.50 | −15 | 93.9 | 99.2 | 7500 | 6500 | 2.5 |
| 6 | 1950 | 92.3 | OLA | 124.1 | 0615 | 22.1 | 0.50 |  | 96.0 | 97.6 | 7200 | 5500 | 2.0 |
| 7 | 1950 | 92.3 | OLA | 49.9 | 0615 | 188.1 | 0.50 |  | 96.8 | 98.2 | 10200 | 5900 | 1.6 |
| 8 | 1950 | 92.3 | OLA | 13.7 | 0615 | 269.0 | 0.50 |  | 95.7 | 98.9 | 11600 | 6100 | 1.6 |
| 9 | 1950 | 92.3 | OLA | 133.2 | 0615 | 43.9 | 0.57 | −22 | 98.0 | 99.3 | 8200 | 5300 | 1.9 |
| 10 | 1950 | 92.3 | OLA | 156.5 | 0615 | 51.6 | 0.67 | −19 | 96.0 | 98.5 | 9100 | 6200 | 2.0 |
| 11 | 4453 | 88.7 | OLA | 116.8 | 0615 | 38.0 | 0.50 |  | 97.3 | 99.3 | 18000 | 11500 | 3.4 |
| 12 | 16750 | 86.5 | OLA | 117.1 | 0615 | 37.7 | 0.50 |  | 96.8 | 98.7 | 78000 | 29600 | 4.2 |
| 13 | 1950 | 92.3 | OLA | 102.1 | 0300 | 35.7 | 0.50 | −18 | 96.4 | 99.2 | 6900 | 5200 | 2.1 |
| 14 | 1950 | 92.3 | OLA | 116.8 | 0600 | 38.7 | 0.50 | −15 | 98.7 | 98.5 | 7500 | 5900 | 2.2 |
| 15 | 1950 | 92.3 | OLA | 108.3 | 1050 | 99.4 | 0.50 |  | 95.4 | 97.9 | 9200 | 5800 | 1.9 |
| 16 | 1950 | 92.3 | OLA | 122.7 | 1840 | 76.5 | 0.50 |  | 96.2 | 98.4 | 9000 | 6100 | 2.1 |
| 17 | 1950 | 92.3 | OLA | 128.9 | 2200 | 41.1 | 0.50 |  | 95.3 | 98.8 | 8000 | 4800 | 1.7 |
| 18 | 1950 | 92.3 | OLA | 23.6 | 2200 | 865.7 | 0.50 |  | 96.7 | 99.3 | 31400 | 5200 | 2.0 |
| 19 | 1950 | 92.3 | OCA | 59.0 | 0615 | 27.3 | 0.50 |  | 97.9 | 99.4 | 5300 | 2800 | 1.9 |
| 20 | 1950 | 92.3 | C21A | 157.5 | 0615 | 47.2 | 0.50 | 2 | 94.3 | 96.1 |  |  |  |
| 21 | 1950 | 92.3 | BHA | 135.6 | 0615 | 42.8 | 0.50 | >50 | 93.8 | 95.8 | 8300 | 6100 | 1.9 |
| 22 | 1950 | 92.3 | STA | 119.3 | 0615 | 34.6 | 0.50 | 41 | 96.9 | 97.7 | 7500 | 5000 | 1.6 |
| 23 | 1950 | 92.3 | STA | 116.1 | 0615 | 42.2 | 0.50 | 38 | 94.1 | 98.3 | 7600 | 5200 | 1.6 |
| 24 | 1950 | 92.3 | TFA | 113.4 | 0615 | 38.3 | 0.50 |  | 95.3 | 97.8 | 7400 | 5500 | 2.0 |

Key for Table 2

Fatty Alcohols
OCA octanol
OLA oleyl alcohol
TFA tallow or suet fatty alcohol
STA stearyl alcohol C21A Exxal-21® from Exxon
BHA behenyl alcohol Methanol-Started Polyethers
0300 polyethylene oxide monool; MW (OH No.)=300
0600 polyethylene oxide monool; MW (OH No.)=600
0615 polyethylene oxide/polypropylene oxide; MW (OH No.)=600 (85% by weight EO, 15% by weight PO); random
1050 polyethylene oxide/polypropylene oxide monool; MW (OH No.)=1040 (50% by weight EO, 50% by weight PO); random
1840 polyethylene oxide/polybutylene oxide monool; MW (OH No.)=1820 (60% by weight EO; 40% by weight BO); random
2200 polyethylene oxide monool; MW (OH No.)=2170

EXAMPLE 25

Transesterification of Poly(n-Butyl Acrylate) with Oleyl Alcohol and Polyethylene Oxide/Polypropylene Oxide Monool The procedure of Example 5 is followed with the difference that 580 g of poly(n-butyl acrylate) from Example 4 are used and toluene is replaced by xylene. The reaction is completed after about 10 hours. The end of the reaction is indicated by a stillhead temperature of about 140° C.

The oleyl alcohol content, determined by gas chromatographic analysis, is about 0.5% and corresponds to a conversion of 99.0%, based on the amount of fatty alcohol used. Gel chromatographic analysis shows an unreacted polyalkylene oxide monool content of 1 to 2%, which corresponds to a conversion in the area of 90 to 95% of the theoretical amount. The product has a pour point of about −17° C. and, after removal of the transesterification catalyst, a Gardner color number of 0 to 1.

EXAMPLE 26

(Comparison Example)

1) Preparation of Oleyl Acrylate

Oleyl alcohol (268 g, approximately 1 mole), 172 g (approximately 2 moles) of methyl acrylate, 1.6 g of isopropyl titanate, 0.27 g of monomethyl hydroquinone and 100 g of toluene are heated to 100° C. under a blanket of dry air in a reactor with a fractionating column. The methanol, set free during the transesterification reaction that takes place, is removed by fractionation as an azeotropic mixture with toluene. At the end of 2 hours, a further 1.1 g of isopropyl titanate are added. The reaction is completed when the stillhead temperature reaches a constant value of 75° C. After that, excess methyl acrylate and toluene are distilled off again at about 90° C. and about 20 torr with access of air. By addition of 40 g of water with access to air, the reaction mixture is heated for 3 hours at 80° C. and the isopropyl titanate is decomposed completely. Finally, the water and isopropanol are distilled off at 90° C. and 20 torr once again with access to air and the remaining product is filtered.

A slightly yellowish product is obtained. The yield, determined by NMR spectroscopic analysis, is about 97% of the theoretical, based on the oleyl alcohol.

A2) Preparation of Polyethylene Oxide/Polypropylene Oxide Monoacrylate

A polyalkylene oxide monool started with methanol (0615) in an amount of 300 g (approximately 0.5 moles), containing 85% by weight of ethylene oxide and 15% by weight of propylene oxide and having a molecular weight, determined from the hydroxyl number, of about 600, 86 g (approximately 1 mole) of methyl acrylate, 1.6 g (+1.1 g) of isopropyl titanate, 0.3 g of monomethyl hydroquinone and 210 g of toluene is reacted in the manner described in Example 26 A1).

A slightly yellowish product is obtained. The yield, based on the polyalkylene oxide monool used, is 98% of theory.

B) Preparation of a Copolymer Containing Oleyl and Polyalkylene Oxide Groups

A solution of 0.6 g of azodiisobutyronitrile and 7.9 g of dodecyl mercaptan in 56.4 g (approximately 0.66 moles) of methyl acrylate, 182 g (approximately 0.57 moles) of oleyl acrylate from Example 26 A1) and 53.4 g (approximately 0.08 moles) of polyethylene oxide/polypropylene oxide monoacrylate from Example 26 A2) and 50 g of toluene are added over a period of 3 hours to a reactor containing 50 g of toluene; the solvent at the same time is under nitrogen and has a temperature of 100° C. At the end of the addition, a further 0.9 g of azodiisobutyronitrile, dissolved in 20 g of methyl ethyl ketone, are added over a period of 2 hours. The reaction is completed after 4 hours at a constant temperature of 100° C. After that, toluene and unreacted methyl acrylate are removed by distillation at 90° C. and 20 torr.

Gas chromatographic analysis reveals a residual methyl acrylate monomer content of methyl acrylate, based on the total monomer mixture, of 2.5%. The oleyl acrylate and polyethylene oxide/polypropylene oxide monoacrylate remaining in the product is determined by NMR spectroscopy to be 8 to 10%.

EXAMPLES 27 TO 32

(Comparison Examples)

The procedure of Example 26 is followed, with the exception that stearyl alcohol is used as fatty alcohol in two cases and that the amounts of the monomers and the dodecyl mercaptan are varied.

The composition of the monomer mixture and the amounts of n-dodecyl mercaptan used are shown in Table 3. Moreover, the approximate theoretical and the gel chromatographically determined number average molecular weights $\overline{M}_n$, as well as the nonuniformity factor determined by way of the weight average molecular weight, and the residual monomer contents are stated. Basically, it must be pointed out that the gel chromatographic comparison of linear and grafted macromolecules is possible, at best, with considerable limitations, because branched macromolecules, as a rule, appear to give smaller molecular weights in the gel chromatogram.

TABLE 3

| Comparison Example No. | Methyl Acrylate Amount (g) | n-Dodecyl Mercaptan Amount (g) | Fatty Alcohol Acrylate | | Polyalkylene Oxide Monool Acrylate Amount (g) | Pour Point (°C.) | $\overline{M}_n$ (g/mole) | | $\overline{M}_w/\overline{M}_n$ | Residual Monomers | |
|---|---|---|---|---|---|---|---|---|---|---|---|
| | | | Type | Amount (g) | | | theor. | pract. | | % MA | Others[1] |
| 26 | 56.4 | 7.9 | OLAC | 182.4 | 53.4 | −2 | 7700 | 13000 | 7.1 | 2.4 | 7.7 |

TABLE 3-continued

| Comparison Example No. | Methyl Acrylate Amount (g) | n-Dodecyl Mercaptan Amount (g) | Fatty Alcohol Acrylate Type | Fatty Alcohol Acrylate Amount (g) | Polyalkylene Oxide Monool Acrylate Amount (g) | Pour Point (°C.) | $\overline{M}_n$ (g/mole) theor. | $\overline{M}_n$ (g/mole) pract. | $\overline{M}_w/\overline{M}_n$ | Residual Monomers % MA | Residual Monomers Others[1] |
|---|---|---|---|---|---|---|---|---|---|---|---|
| 27 | 44.4 | 7.3 | OLAC | 192.3 | 56.1 | −12 | 8400 | 13000 | 7.3 | 2.7 | 9.9 |
| 28 | 31.3 | 6.6 | OLAC | 202.9 | 59.4 | −14 | 9300 | 12000 | 5.8 | 2.5 | 11.6 |
| 29 | 54.0 | 20.3 | OLAC | 174.9 | 51.0 | −13 | 3000 | 2600 | 2.8 | 2.4 | 8.7 |
| 30 | 55.8 | 7.9 | STAC | 183.9 | 52.4 | 40 | 7700 | 4630 | 2.4 | 0.2 | 1.2 |
| 31 | 53.5 | 20.3 | STAC | 176.1 | 53.5 | 36 | 3000 | 1800 | 2.0 | 0.2 | 1.1 |
| 32 | 56.1 | 7.9 | OLAC | 182.1 | 54.0[2] | 0 | 7700 | 11300 | 6.5 | 2.3 | 6.5 |

[1] calculated as oleyl acrylate from H-NMR analysis or as stearyl acrylate from GC analysis
[2] prepared using a polyethylene oxide monool (O600) started on methanol and having a molecular weight of 600

Key for Table 3:
OLAC = oleyl acrylate
STAC = stearyl acrylate

COMPARISON TABLE 1

Comparison of the Nonuniformity Coefficient of the Inventive Copolymers and Copolymers of the State of the Art

| Example No. | | Ester group Content of Polymer in Mole % Methyl ester | Ester group Content of Polymer in Mole % Fatty alkyl-ester | Ester group Content of Polymer in Mole % Polyoxyalkyleneester | $\overline{M}_n$ [g · mole$^{-1}$] Theoretical | $\overline{M}_n$ [g · mole$^{-1}$] De-facto | Non-uniformity Coefficient [$\overline{M}_w/\overline{M}_n$] |
|---|---|---|---|---|---|---|---|
| 5 | Of the invention | 0.5 | 0.4 oleyl | 0.06 | 7500 | 6500 | 2.5 |
| 26 | Not of the invention | 0.5 | 0.43 oleyl | 0.06 | 7700 | 13000 | 7.1 |
| 9 | Of the invention | 0.45 | 0.48 oleyl | 0.07 | 8200 | 5300 | 1.9 |
| 27 | Not of the invention | 0.43 | 0.5 oleyl | 0.07 | 8400 | 13000 | 7.3 |
| 10 | Of the invention | 0.38 | 0.54 oleyl | 0.08 | 9100 | 6200 | 2.0 |
| 28 | Not of the invention | 0.36 | 0.63 oleyl | 0.09 | 9300 | 12000 | 5.8 |
| 14 | Of the invention | 0.51 | 0.43 oleyl | 0.06 | 7500 | 5900 | 2.2 |
| 32 | Not of the invention | 0.50 | 0.44 oleyl | 0.06 | 7700 | 11300 | 6.5 |
| 22 | Of the invention | 0.50 | 0.44 stearyl | 0.06 | 7500 | 5000 | 1.6 |
| 30 | Not of the invention | 0.51 | 0.44 stearyl | 0.06 | 7700 | 4630 | 2.4 |

It is clear from Table 3 that the comparison products of the state of the art prepared by copolymerization have partly a high content of monomeric, low molecular compounds.

Referring to Comparison Table 1, it is clear from that a comparison of the inventive compounds and the noninventive compounds prepared by copolymerization, which latter have the same or almost the same composition, that the inventive compounds have a substantially lower non-uniformity coefficient than the compounds of the state of the art. It is particularly noticeable in this context that this non-uniformity coefficient is particularly high if esters of oleyl alcohol are contained in the polymeric acrylic acid ester. The reason for this is that in the free radical copolymerization corresponding to the procedure of the state of the art, also the double bonds of the oleyl alcohol are partially affected by the polymerization reaction. This side reaction is completely eliminated if the polymers are prepared by transesterification of polyacrylic acid esters with oleyl alcohol. The inventive compounds which are producible by a transesterification reaction thus differ considerably from the products of the state of the art by lacking these additional cross linking points. The nonuniformity coefficient of the inventive polymers, however, is also lower than with the compounds of the state of the art if a saturated alcohol such as, for example, stearyl alcohol, is used instead of oleyl alcohol as the transesterification component.

Practical Test

In a practical test, the effect of inventive transesterification products and of copolymers, which are not of the invention, as an emulsifier for the water/diesel oil system are investigated at 25° C. For this purpose the following are used:

79.9% by volume of diesel oil
20% by volume of water
0.1% by volume of emulsifier.

For the preparation of the emulsion, 0.6 ml of emulsifier are dissolved in 480 ml of diesel oil in a calibrated vessel. Within a period of 3 minutes, 120 ml of water are added dropwise with high-shear stirring (Ultraturrax, approximately 10,000 rpm) and the emulsion obtained is homogenized for a further 2 minutes under the same conditions.

To evaluate the stability of the emulsion, the volume of the segregated oil phase is determined after 10, 30, 60 and 120 minutes. The results obtained are given in Table 4.

COMPARISON TABLE 2

Comparison of the Emulsification Capacity of the Inventive Copolymers and Colpolymers of the State of the Art

| Example No. | | Ester group Content of Polymer in Mole % Methyl ester | Ester group Content of Polymer in Mole % Fatty alkyl-ester | Ester group Content of Polymer in Mole % Polyoxyalkyleneester | $\overline{M}_n$ [g · mole$^{-1}$] Theoretical | $\overline{M}_n$ [g · mole$^{-1}$] De-facto | Nonuniformity Coefficient [$\overline{M}_w/\overline{M}_n$] | Diesel Oil Segregation from the Emulsion [Vol. % Oil Phase] After x minutes x = 10 | 30 | 60 | 120 |
|---|---|---|---|---|---|---|---|---|---|---|---|
| 5 | Of the invention | 0.5 | 0.4 oleyl | 0.06 | 7500 | 6500 | 2.5 | 5 | 23 | 36 | 46 |
| 26 | Not of the invention | 0.5 | 0.43 oleyl | 0.06 | 7700 | 13000 | 7.1 | 8 | 37 | 40 | 52 |
| 9 | Of the invention | 0.45 | 0.48 oleyl | 0.07 | 8200 | 5300 | 1.9 | 2 | 6 | 12 | 24 |

COMPARISON TABLE 2-continued

Comparison of the Emulsification Capacity of the Inventive Copolymers and Colpolymers of the State of the Art

| Example No. | | Ester group Content of Polymer in Mole % | | | $\overline{M}_n$ [g · mole$^{-1}$] | | Nonuniformity Coefficient $[\overline{M}_w/\overline{M}_n]$ | Diesel Oil Segregation from the Emulsion [Vol. % Oil Phase] After x minutes | | | |
|---|---|---|---|---|---|---|---|---|---|---|---|
| | | Methyl ester | Fatty alkyl- ester | Polyoxyal- kyleneester | Theoreti- cal | De- facto | | x = | | | |
| | | | | | | | | 10 | 30 | 60 | 120 |
| 27 | Not of the invention | 0.43 | 0.5 oleyl | 0.07 | 8400 | 12000 | 7.3 | 6 | 12 | 22 | 32 |
| 10 | Of the invention | 0.38 | 0.54 oleyl | 0.08 | 9100 | 6200 | 2.0 | 2 | 6 | 12 | 24 |
| 28 | Not of the invention | 0.36 | 0.63 oleyl | 0.09 | 9300 | 12000 | 5.8 | 5 | 12 | 25 | 36 |
| 14 | Of the invention | 0.51 | 0.43 oleyl | 0.06 | 7500 | 5900 | 2.2 | 2 | 7 | 16 | 36 |
| 32 | Not of the invention | 0.50 | 0.44 oleyl | 0.06 | 7700 | 11300 | 6.5 | 6 | 27 | 40 | 50 |
| 22 | Of the invention | 0.50 | 0.44 stearyl | 0.06 | 7500 | 5000 | 1.6 | 10 | 34 | 40 | 46 |
| 30 | Not of the invention | 0.51 | 0.44 stearyl | 0.06 | 7700 | 4630 | 2.4 | 30 | 49 | 54 | 57 |

It is evident from Comparison Table 2 that the inventive compounds exhibit improved emulsifying characteristics if compared to the compounds of the state of the art obtained by copolymerization.

Although applicant does not want to explain the invention by any theory, and thus does not want to be limited to any theoretical explanations, it is believed that this improved effect can be explained by the fact that the content of non-emulsifying monomers is lower in the inventive polymers whereby the content of compounds which have an emulsifying action is increased. Further, it can be assumed that the distribution of the ester of the fatty alcohols and of the polyoxyalkylene monools is more even along the polyacrylic acid ester chain than it is in a polymer which is obtained by copolymerization of the different monomeric units. Due to the different polymerization parameters of the individual monomers, it would hardly be possible to obtain polymers which have a statistical distribution of the different ester groups in the polymer such as can be assumed in the inventive compounds.

TABLE 4

| Emulsifier from Example No. | Diesel Oil Segregation After Minutes | | | |
|---|---|---|---|---|
| | 10 | 30 | 60 | 120 |
| of the invention | | | | |
| 5 | 5 | 23 | 36 | 46 |
| 9 | 2 | 6 | 12 | 24 |
| 10 | 2 | 6 | 12 | 24 |
| 11 | 2 | 12 | 22 | 35 |
| 12 | 7 | 18 | 28 | 40 |
| 13 | 8 | 33 | 47 | 49 |
| 14 | 2 | 7 | 16 | 36 |
| not of the invention | | | | |
| 26 | 8 | 37 | 40 | 52 |
| 27 | 6 | 12 | 22 | 32 |
| 28 | 5 | 12 | 25 | 36 |
| 30 | 30 | 49 | 54 | 57 |
| 32 | 6 | 27 | 40 | 50 |

It is clear that the emulsifying action of products from transesterification is generally superior to that of products which are obtained by copolymerization and have approximately the same chemical composition.

We claim:

1. A polyacrylate ester having long-chain hydrocarbon and polyoxyalkylene groups prepared by transesterifying a polyacrylate alkyl ester, the alkyl groups of which contain 1 to 4 carbon atoms and which is obtained by free radical polymerization, wherein the transesterification is carried out with a mixture of
   a) alcohol selected from at least one member of the group consisting of
      a1) saturated aliphatic alcohols having 4 to 22 carbon atoms,
      a2) unsaturated aliphatic alcohols having 8 to 22 carbon atoms,
      a3) alkyl phenols, the alkyl groups of which in each case have 8 to 12 carbon atoms, and their oxyalkylation products containing 1 to 3 oxyalkylene groups, selected from the group consisting of oxyethylene groups, oxypropylene groups, and a combination thereof, and
   b) polyoxyalkylene monool of the average formula $$R^1O\text{-}(C_nH_{2n}O\text{-})_xH$$

wherein $R^1$ is the hydrocarbon group of a starter alcohol, $R^1OH$, n is 2, 3 or 4 and has an average value of 2 to 3 in the average polyoxyalkylene group x has an average value of 4 to 50 in the average polyoxyalkylene group, and the molar ratio of a:b is 1:11 to 28:1, in such amounts, that up to 70% of the ester groups are reacted in the presence of a transesterification catalyst at a temperature of 70° to 160° C., the non-uniformity coefficient of ester ranging from 1.6 to 2.5 and by contrast said coefficient of ester prepared by the known state of the art copolymerization method ranging from 2.4 to 7.3, the coefficient of any specific ester prepared by the present method never being the same as the coefficient of the same ester prepared by the copolymerization method.

2. The polyacrylate ester of claim 1, wherein a saturated fatty alcohol having 12 to 18 carbon atoms is used as alcohol a1.

3. The polyacrylate ester of claim 1 wherein stearyl alcohol, suet or tallow alcohol is used as alcohol a1.

4. The polyacrylate ester of claim 1, wherein oleyl alcohol is used as alcohol a2.

5. The polyacrylate ester of claim 1, wherein the R1 group of the polyoxyalkylene monool is a methyl group.

6. The polyacrylate ester of claim 1, wherein the subscript n of the polyoxyalkylene monool is 2 or 3 and has a value of 2.1 to 2.3 in the average molecule.

7. The polyacrylate ester of claim 1, wherein the subscript x of the polyoxyalkylene monool has an average value of 6 to 20 in the average molecule.

8. The polyacrylate ester of claim 1, wherein the molar ratio of component a) to component b) is 1:10 to 10:1 during the transesterification.

9. The polyacrylate ester of claim 1, wherein the molar ratio of component a) to component b) is 5:1 to 9:1 during the transesterification.

10. The polyacrylate ester of claim 1, in which up to 50 mole percent of the acrylate alkyl ester is replaced by the corresponding alkyl methacrylate ester during the transesterification.

11. The polyacrylate ester of claim 1, in which the transesterification is carried out in the presence of a solvent.

12. A water/oil emulsifier useful for natural and synthetic oils comprising a polyacrylate ester of claim 1.

13. A water/oil emulsion comprising water, a natural or synthetic oil and as an emulsifier, a polyacrylate ester defined in claim 1.

* * * * *